R. W. HAWES.
Thill-Coupling.

No. 215,921. Patented May 27, 1879.

WITNESSES:
Achilles Schehl.
C. Sedgwick

INVENTOR:
R. W. Hawes
BY Munn & Co
ATTORNEYS.

UNITED STATES PATENT OFFICE.

RICHARD W. HAWES, OF HOHOKUS, NEW JERSEY.

IMPROVEMENT IN THILL-COUPLINGS.

Specification forming part of Letters Patent No. 215,921, dated May 27, 1879; application filed March 11, 1879.

*To all whom it may concern:*

Be it known that I, RICHARD W. HAWES, of Hohokus, in the county of Bergen and State of New Jersey, have invented a new and Improved Thill-Coupling, of which the following is a specification.

Figure 1:
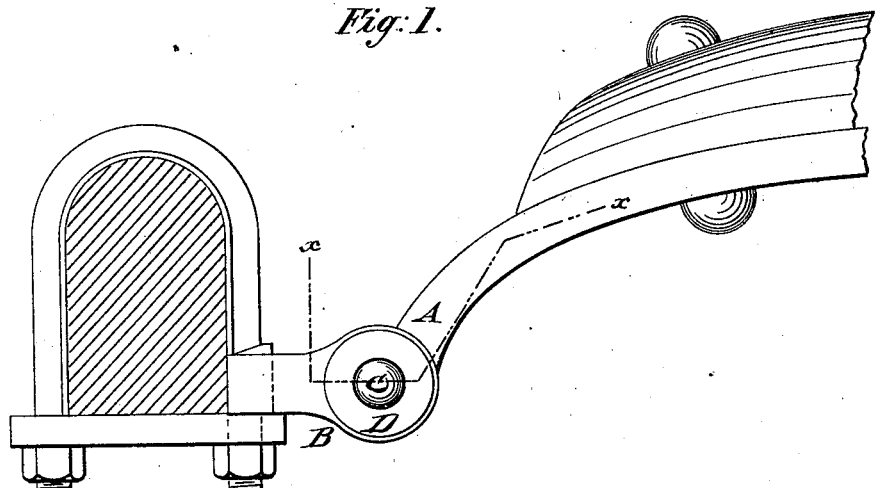
Figure 2:
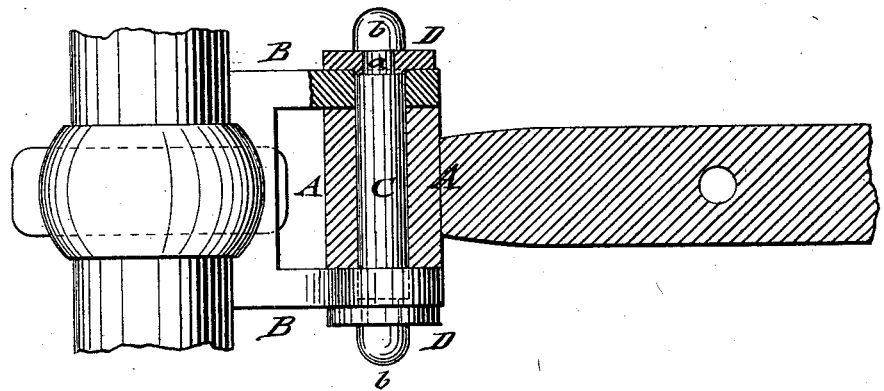

In the accompanying drawings, Figure 1 represents a sectional side elevation of my improved thill-coupling; and Fig. 2, a top view of the same, partly in section, on line $x$ $x$, Fig. 1.

Similar letters of reference indicate corresponding parts.

This invention relates to a simple and reliable thill-coupling, by which the shaft may be readily applied and retained on the axle without danger of loosening the nut of the eye-bolt, the shaft being held without rattling, and also quickly detached from the eyes of the axle-clip.

The invention consists of the eye of the thill-strap being pivoted to the eyes of the axle-clip by a cross-pin, with annular grooves near both ends, the cross-pin being retained in position by rubber washers compressed between the eyes of the axle-clip and the heads of the cross-pins.

Referring to the drawings, A represents the eye of the strap that is attached to the eyes or bearings B of the axle-clip, to which the shaft-eye is hung or coupled by a cross-pin, C. The cross-pin C is employed in place of the common bolt and screw-nut, that are apt to get loose and detached, and is made with two annular recesses or grooves, $a$, and with rounded-off heads $b$ at both ends.

Between the outer faces of the eyes B and the heads $b$ are inserted elastic washers or rings D, of rubber or other suitable material, which fit tightly into the annular grooves of the cross-pin C. The portion of the cross-pin between the annular grooves being made shorter than the distance of the outer faces of the eyes B, the washers are firmly compressed by the heads, and thereby the cross-pin held firmly and reliably in position, without any danger of playing loose.

The rubber washers prevent any rattling of the cross-pin, and produce, in connection with the customary rubber cushion back of the strap-eye, a smoothly-working and noiseless thill-coupling. The shaft may be readily detached by removing one of the washers and taking out the cross-pin, it being readily replaced by reinserting the cross-pin and compressing the washer on one side, so that the washer at the opposite side may be readily slipped into position in the groove between the clip-eye and opposite head of the pin.

An exceedingly simple and easily-handled thill-coupling is thus obtained by means of the cross-pin and elastic binding-washers.

Having thus fully described my invention, I claim as new and desire to secure by Letters Patent—

The thill-coupling cross-pin C, provided with an annular groove near each end, and the two elastic rings D, in combination with the strap-eye A, to allow the pin to be first inserted, and the rings to be then sprung into the grooves, as described.

RICHARD W. HAWES.

Witnesses:
C. SEDGWICK,
J. H. SCARBOROUGH.